(12) United States Patent
Kondo

(10) Patent No.: US 6,343,080 B1
(45) Date of Patent: Jan. 29, 2002

(54) DEVICES FOR SWITCHING OVER ELECTRICAL CONNECTIONS

(75) Inventor: Naohiro Kondo, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/200,854

(22) Filed: Nov. 30, 1998

(30) Foreign Application Priority Data

May 12, 1997 (JP) .............................................. 9-335765

(51) Int. Cl.⁷ ............................................ H04L 12/437
(52) U.S. Cl. ...................................... 370/401; 370/217
(58) Field of Search ................................ 370/401, 216, 370/217, 221, 219, 220

(56) References Cited

U.S. PATENT DOCUMENTS

| 5,546,378 A | * | 8/1996 | Wirth et al. | |
| 5,710,777 A | * | 1/1998 | Gawne | 370/222 |
| 6,035,340 A | * | 3/2000 | Fischer et al. | 709/249 |
| 6,175,577 B1 | * | 1/2001 | Haddock et al. | 370/423 |

FOREIGN PATENT DOCUMENTS

| JP | 8-8952 | 1/1996 |
| JP | 9-93255 | 4/1997 |
| JP | 9-93277 | 4/1997 |

* cited by examiner

Primary Examiner—Douglas Olms
Assistant Examiner—Ken Vanderpuye
(74) Attorney, Agent, or Firm—Greenblum & Bernstein, P.L.C.

(57) ABSTRACT

A device for switching over hub units is connected to a first hub unit or a second hub unit in an electrically interchangeable manner on one hand, and connectable to a plurality of terminal apparatuses on the other hand. The device and the first and second hub units, respectively, include an equal number of device ports, first hub ports and second hub ports for receiving or emitting data signals. The device further includes a unit-conversion switch. The device ports each contain a first connector connected to a first hub port via a first cable, a second connector connected to a second hub port via a second cable, and a third connector being connectable to a terminal apparatus via a third cable, respectively. The device ports further contain switching elements for connecting the third connectors either to the first connectors or to the second connectors. All of the switching elements are controlled by the unit-conversion switch, such that all of the third connectors are switched over either to the first connectors or to the second connectors.

14 Claims, 4 Drawing Sheets

DEVICES FOR SWITCHING OVER ELECTRICAL CONNECTIONS

BACKGROUND OF THE INVENTION

1. Field of the Invention

The present invention relates to the field of a local area network (designated hereinafter as LAN) and to a unit for assembling electric cables (designated as a "hub" unit) used in a network LAN. The invention concerns, in particular, a device for switching over hub units, a wiring system including this device, and a method of using this device.

2. Description of Background Information

Recent developments in communications technology such as computer networks have increased the construction of network LAN which connects the terminals of computers or their accessories to one another in rooms or buildings. The network LAN includes a "peer-to-peer" system, as shown in FIG. 1, in which data is exchanged between terminal apparatuses 1 on the same ranking basis. It also includes a "client-server" system, as shown in FIG. 2, in which a plurality of terminal apparatuses 1 (client apparatuses) are connected to a server 2 which executes administrative functions. In both cases, a hub unit 4 is set up for assembling a plurality of electric cables 3.

The hub unit 4 is a prerequisite for putting into practice a star-type wiring system in network LAN which includes system 10BASE-T. Twisted paired wire cables 3 extend from all terminal apparatuses 1 and control their network.

When hub unit 4 breaks down, a special maintenance staff is needed to repair it. However, during the reparation at least, all terminal apparatuses 1 connected to the broken-down hub unit 4 have to wait for the reparation thereof, before retrieving communications. This causes great inconveniences. Especially, when the specialist is away, the time of waiting for reparation becomes economically unsustainable. Therefore, the specialist is often obliged to be available during all working hours.

Thus, an object of the present invention is to provide a hub unit switching device used in network LAN that secures a communications function. By virtue of this device, when a hub unit breaks down, it can easily be repaired by non-maintenance staff and recovers the communications function.

SUMMARY OF THE INVENTION

According to one aspect of the invention, a device is provided for switching over hub units, the device being connected either to a first hub unit or to a second hub unit in an electrically interchangeable manner on the one hand, and adapted to be connected to a plurality of terminal apparatuses on the other hand. The device and the first and second hub units respectively contain an equal number of device ports, first hub ports and second hub ports for entering or emitting data signals. The device for switching over hub units further comprises a unit-conversion switch. The device ports each contain a first, a second, and a third connector. All of the first connectors are connected to the first hub ports via first cables, all of the second connectors are connected to the second hub ports via second cables, and all of the third connectors are adapted to be connected to the terminal apparatuses via third cables. The third connectors each comprise a switching element and are adapted to be switched over either to the first connectors or to the second connectors. The unit-conversion switch controls all of the switching elements, such that the terminal apparatuses can be switched over either to the first hub unit or to the second hub unit.

The device for switching over hub units may comprise a frame, and the unit-conversion switch may be provided outside the frame.

Further, the first, second and third connectors contained in the device ports may be differentiated by colors.

As another aspect of the invention, the unit-conversion switch may be connected in parallel with a remote control device. This remote control device contains a remote control switch, such that all of the third connectors can be switched over either to the first connectors or to the second connectors.

Further, there is provided a wiring system comprising the above-mentioned device and at least one of the plurality of terminal apparatuses connected to the device via the third connectors.

The invention also relates to a method of using the device for switching over hub units, the device being further connected to at least one of the plurality of terminal apparatuses via the third connectors. The method comprises:

- electrically connecting at least one of the plurality of terminal apparatuses to the third connectors via the third cables;
- electrically connecting the third connectors to the first connectors, so that the device for switching over hub units is connected to the first hub ports via the first cables; and
- switching over the unit-conversion switch, when a breakdown occurs in the first hub unit, so that the switching elements are switched over from the first connectors to the second connectors, whereby the device for switching over hub units is electrically connected to the second hub unit, and the first hub unit is thus made ready for reparation.

In the above method, the unit-conversion switch may be electrically connected in parallel with a remote control device. This remote control device comprises a remote control switch capable of switching the switching elements, such that the device for switching over hub units is switched over either to the first hub unit or to the second hub unit.

BRIEF DESCRIPTION OF THE DRAWINGS

The above, and other objects, features, advantages of the present invention will become apparent from the following description of the preferred embodiments, given as non-limiting examples, with reference to the accompanying drawings, and in which.

DETAILED DESCRIPTION OF THE PREFERRED EMBODIMENTS

Figure 1:
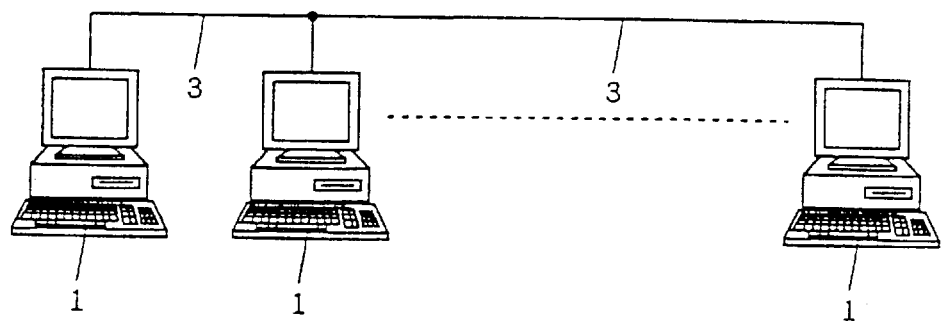
FIG. 1 schematically shows terminals arranged on the same ranking basis in network LAN.
Figure 2:
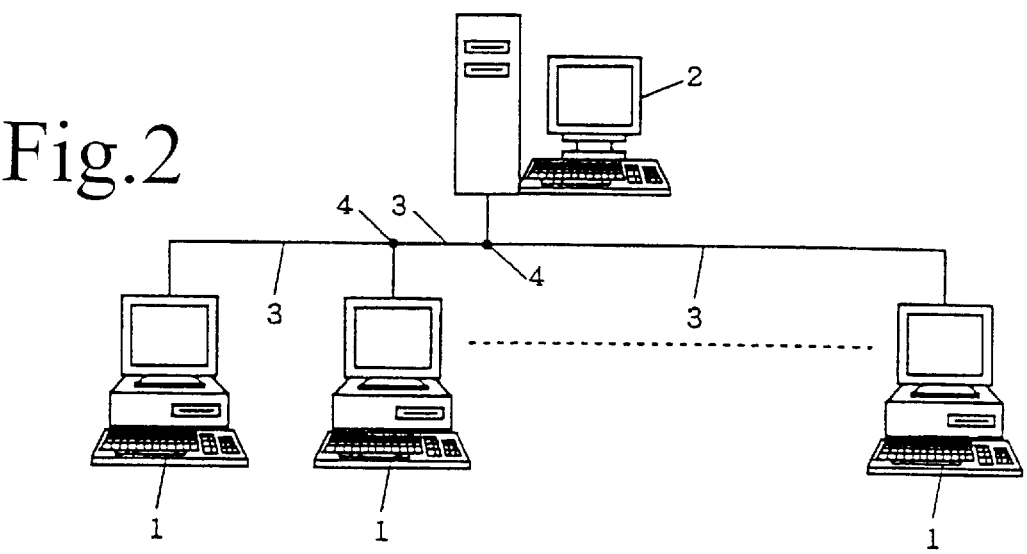
FIG. 2 schematically shows a terminal arrangement using a server in network LAN.
Figure 3:
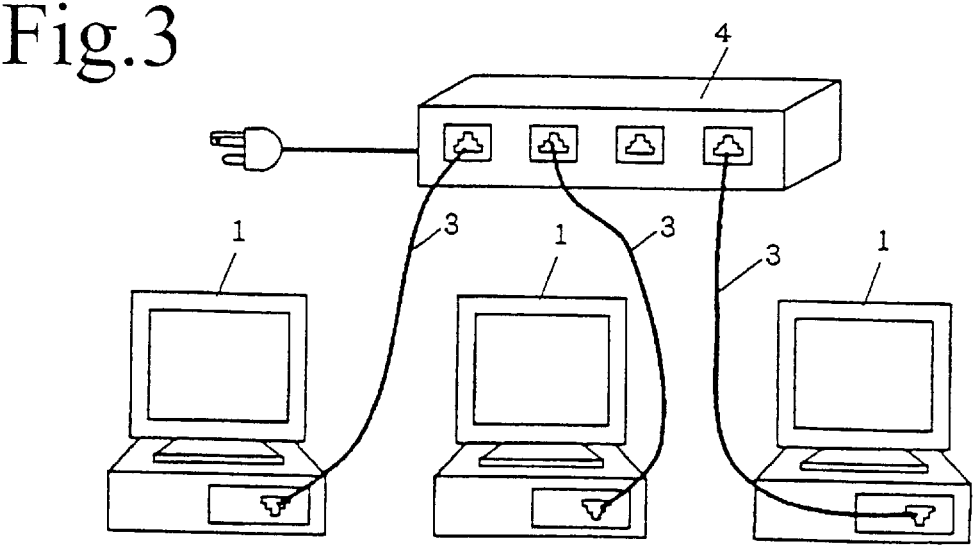
FIG. 3 shows the terminals connected to a hub unit.
Figure 4:
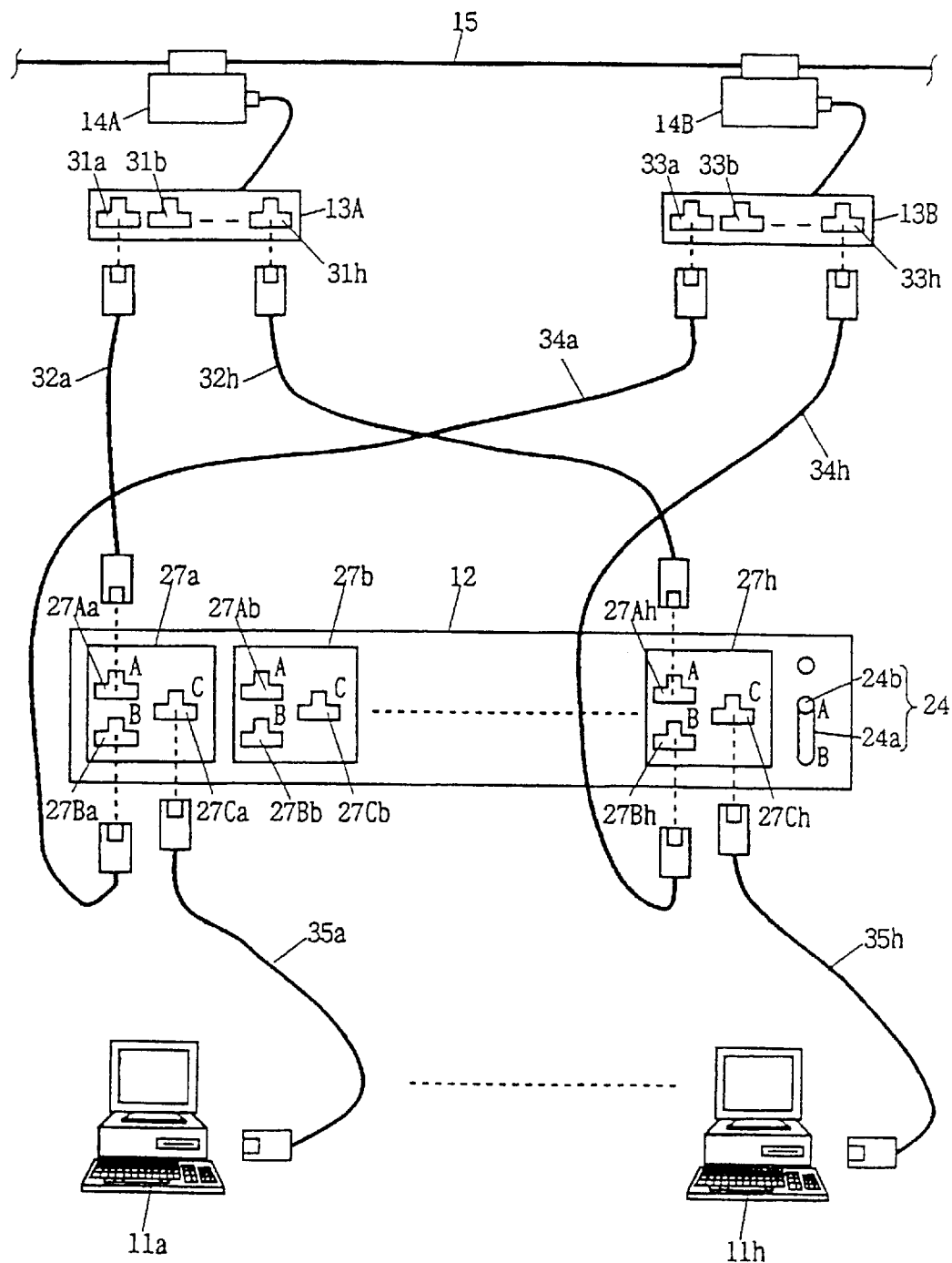
FIG. 4 shows a wiring system which includes the device for switching over hub units according to the invention.
Figure 5:
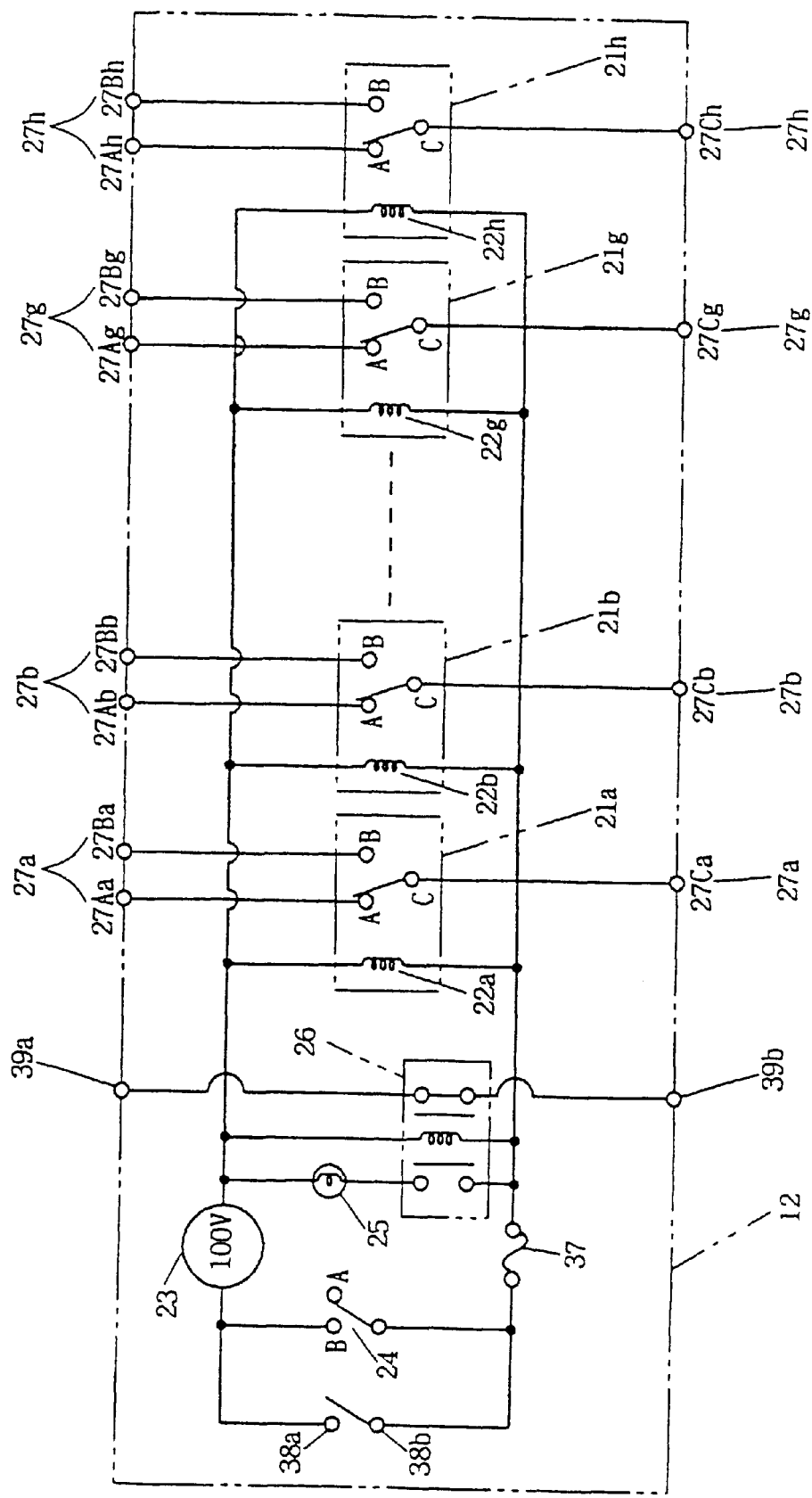
FIG. 5 shows the internal circuits contained in the device for switching over hub units according to the invention.

FIG. 4 shows a wiring system in which the device for switching over hub units according to a first embodiment of the present invention is applied. FIG. 5 shows internal circuits of this device. In the internal circuits, as shown in FIG. 4, a plurality of terminals 11a to 11h can be connected interchangeably to a hub unit 13A or to a hub unit 13B via a device 12.for switching over hub units. Further, both hub units 13A and 13B are connected to a main line 15 via connection interfaces 14A and 14B such as a transceiver or a module.

The terminals 11a to 11h mentioned above include computers or their accessories such as a printer, which function as servers or clients. These terminals are also provided with standardized communications functions for 10BASE-T, token-rings, or the like.

Both the hub units 13A and 13B have a known structure in which each of the connectors is wired into a star-type wiring network. Both may have the same number of ports, e.g., 8 ports, which is the number commonly used. For example, first hub unit 13A may be used every day and second hub unit 13B for emergency.

As shown in FIG. 5, device 12 includes the same number of two-terminal relays 21a to 21h (switching elements) as the hub ports in hub unit 13A or 13B, and the same number of coils 22a to 22h. Device 12 further includes a switch 24 for connecting or disconnecting an electrical source 23, a pilot lamp 25 for indicating the state of switch 24, a lamp relay 26 for controlling, on an on-off basis, the source supply which is brought from electrical source 23 to pilot lamp 25 via interchanging switch 24, and device ports 27a to 27h where internal circuits are led out from each contact point of two-terminal relays 21a to 21h towards outside connections. The device ports 27a to 27h contained in device 12 contain three series of modular jacks 27Aa to 27Ah (A-modular jacks), 27Ba to 27Bh (B-modular jacks) and 27Ca to 27Ch (C-modular jacks), respectively, as shown in FIGS. 4 and 5. Modular jacks 27Aa to 27Ah (first series of connecting terminals) are connected to modular jacks 31a to 31h contained in the first hub ports of first hub unit 13A. The connections are via twisted paired wire cables 32a to 32h (first cables). Likewise, modular jacks 27Ba to 27Bh (second series of connecting terminals) are connected to modular jacks 33a to 33h contained in the second hub ports of second hub unit 13B. The connections are via twisted paired wire cables 34a to 34h (second cables). On the other hand, modular jacks 27Ca to 27Ch (third series of connecting terminals) can be connected to the modular jacks in terminals 11a to 11h via twisted paired wire cables 35a to 35h (third cables).

In order to make clear distinction when wiring, modular jacks 27A to 27Ah, modular jacks 27Ba to 27Bh and modular jacks 27Ca to 27Ch in each of device ports 27a to 27h of device 12 are colored, for example, red, yellow and blue, respectively.

The two-terminal relays 21a to 21h in FIG. 5 contain a contact-type electromagnetic relay element. In this element, the electrically turned on or turned off state is established on the negatively charged side through mechanical contact, depending on whether the electric current from electric source 23 is supplied to coils 22a to 22h. This is done by opening or closing switch 24. Coils 22a to 22h are connected to one another in parallel, and then to electrical source 23 and switch 24. As to a pair of contact points A and B in two-terminal relays 21a to 21h, contact point A is connected to A-modular jacks 27A to 27Ah in device ports 27a to 27h, whereas contact point B is connected to B-modular jacks 27Ba to 27Bh in device ports 27a to 27h. Contact point C is connected to C-modular jacks 27Ca to 27Ch in ports 27a to 27h and then to terminal apparatuses 11a to 11h, respectively. They can be relayed to contact point A or B. As long as coils 22a to 22h are cut off from electrical source 23, contact points C may be connected to contact points A, which are in turn connected to daily use first hub unit 13A. When coils 22a to 22h are fed electrically, contact points C are switched over to contact points B in auxiliary use second hub unit 13B.

As shown in FIG. 4, switch 24 is arranged outside the frame front of device 12 for switching over hub units, and serves for opening or closing the contact. For example, the front wall of the frame is provided with an oval-shaped slit 24a, into which switch knob 24b is fitted with enough play. This switch knob 24b is moved freely in slit 24a between an upper position and a bottom position (both shown in FIG. 4). The upper position indicates that switch 24 is open, i.e., connected to contact point A. Likewise, the bottom position indicates that switch 24 is closed, i.e., connected to contact point B. In the letters A and B mentioned above, those in switch 24 are designated in accordance with those in two-terminal relays 21a to 21h, as shown in FIG. 5, so that both cases represent the same electrical state. Coils 22a to 22h in two-terminal relays 21a to 21h are supplied with electricity via source 23 only when switch 24 is closed, i.e., connected to contact point B.

As for the twisted paired wire cables 32a to 32h, 34a to 34h and 35a to 35h which are connected to each of device ports 27a to 27h in device 12, modular plugs are mounted thereto and serve as connectors. They are colored in a color chosen for each of the series of modular jacks 27Aa to 27Ah, 27Ba to 27Bh and 27Ca to 27Ch in device ports 27a to 27h. Usually, the modular plugs of twisted paired wire cables 32a to 32h are colored red as are A-modular jacks 27Aa to 27Ah, those of twisted paired wire cables 34a to 34h in yellow as are B-modular jacks 27Ba to 27Bh, and those of twisted paired wire cables 35a to 35h in blue as are C-modular jacks 27Ca to 27Ch.

Electrical source 23, shown in FIG. 5, may use alternating current with 100 V, for example. FIG. 5 also shows fuse 37 and input terminals 38a and 38b for entering switch signals for remote control device 41 shown in FIG. 6. Remote control device 41 is connected to external terminals 39a and 39b which send switching confirmation signals to remote control device 41.

Figure 6:
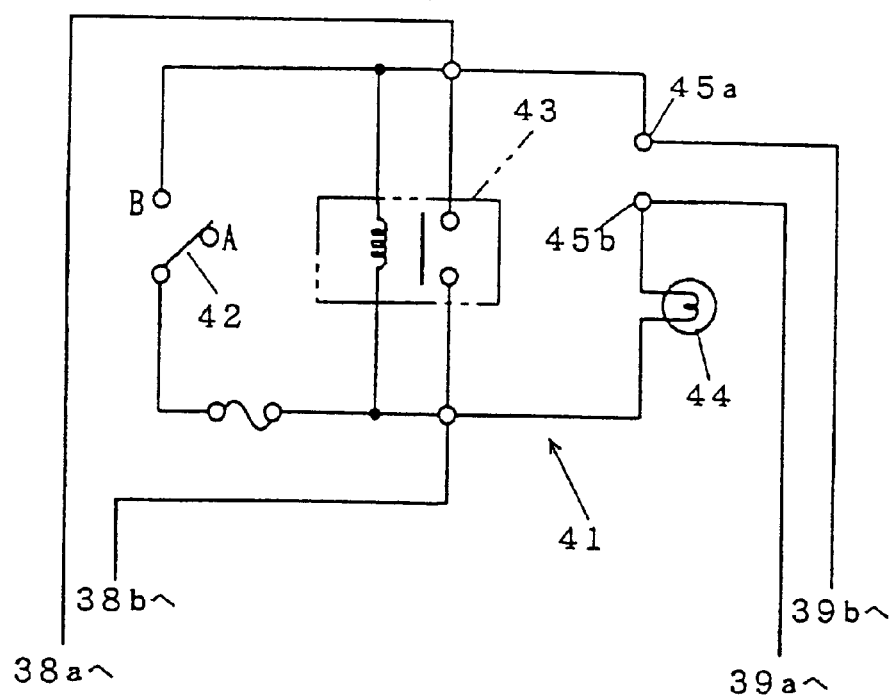
FIG. 6 shows the internal circuits contained in a remote control device according to another aspect of the invention.

Remote control device 41 switches on or off device 12 by remote control. As shown in FIG. 6, the remote control device includes a switch 42 for switching the contact between point A (open side) and point B (closed side), an open relay 43 which is switched off or on by switch 42, and a lamp 44 connected in parallel with open relay 43. Both ends of open relay 43 are connected to input terminals 38a and 38b and to a relay 26 (FIG. 5) for lamp and coils 22a to 22h for two-terminal relays 21 a to 21h via input terminals 38a and 38b. The ends of lamp 44 are connected to external connection terminals 45a and 45b in series and to relay 26 via external terminals 39a and 39b. When switch 42 is closed at point B in remote control device 41, open relay 43 is put into the closed state, so that switch 24 of device 12 is also switched. Relay 26 in device 12 is turned on. Pilot lamp 25 is fed electrically, and lamp 44 is also fed electrically via external connection terminals 45a and 45b. Consequently, by observing lamp 44 in remote control device 41, the state of device 12 can be determined.

The wiring system, including device 12 for switching over hub units, is used as follows:

In normal states, communications are carried out via first hub unit 13A and corresponding connection interface 14A.

Second hub unit 13B and corresponding connection interface 14B are therefore not in use. In this state, switch 24 in device 12 shown in FIG. 5 is connected to contact point A, i.e., internal circuits are disconnected, and there is no electric current in coils 22a to 22h contained in two-terminal relays 21a to 21h. Accordingly, all contact points C contained in two-terminal relays 21a to 21h are connected to corresponding contact points A. Hence, in device ports 27a to 27h contained in device 12, C-modular jacks 27Ca to 27Ch are electrically connected to A-modular jacks 27Aa to 27Ah. As a result, terminal apparatuses 11a to 11h connected to C-modular jacks 27Ca to 27Ch are connected to first hub unit 13A via two-terminal relays 21a to 21h and A-modular jacks 27Aa to 27Ah.

In this state, when making group communications among terminal apparatuses 11a to 11h, data signals emitted from any one of these terminal apparatuses are passed through a corresponding twisted paired wire cable (series 35a to 35h), C-modular jack contained in device ports (series 27a to 27h), two-terminal relay (series 21a to 21h), device port (series 27a to 27h) and twisted paired wire cable (series 32a to 32h) and entered into a corresponding modular jack (series 31a to 31h) contained in the hub ports or primary use first hub unit 13A. Thus, the data signals may be entered from any one of terminal apparatuses 11a to 11h into a corresponding modular jack (series 31a to 31h). As first hub unit 13A contains a star-type wiring network, the signals are electrically connected and supplied to the other modular jacks of the hub ports. Then, the signals received at the other modular jacks may be passed through a corresponding twisted paired wire cable (series 32a to 32h), A-modular jacks, two-terminal relay (series 21a to 21h), C-modular jack and twisted paired wire cable (series 35a to 35h), and addressed to the other terminal apparatuses (series 11a to 11h). The addressed terminal apparatuses acknowledge the data signals and carry out the processing required.

When data signals are to be sent to another group of terminal apparatuses (communications outside the group) via main line 15, they are first sent to first hub unit 13A in the same manner as described above, and then to main line 15 via connection interface 14A.

When short circuits or wire-cuts occur in primary use first hub unit 13A, thus disrupting communications inside and outside the group, first hub unit may be urgently repaired, as has been done in the past. However, it will take some time before precisely determining the reasons for breakdown and the repair. Moreover, if the maintenance staff is away, it will be difficult for users, who are not maintenance specialists, to perform reparation.

In the wiring system according to an embodiment of the invention, switch 24 is preferably located on the front frame of device 12, so that one only needs to shift the switch from contact point A where the circuit is open, to contact point B where the circuit is closed.

In device 12 shown in FIG. 5, electric current is supplied from electrical source 23 into coils 22a to 22h contained in two-terminal relays 21a to 21h by closing switch 24. Then, by virtue of electromagnetically induced forces, contact points C contained in two-terminal relays 21a to 21h are switched over from contact points A to contacts points B. In this way, C-modular jacks 27Ca to 27Ch contained in device ports 27a to 27h of device 12 are electrically disconnected from A-modular jacks 27Aa to 27Ah which are connected to first hub unit 13A. Instead, they are swung to B-modular jacks 27Ba to 27Bh which are connected to second hub unit 13B. Accordingly, terminal apparatuses 11a to 11h become connected to second hub unit 13B via twisted paired wire cables 35a to 35h, C-modular jacks 27Ca to 27Ch contained in device ports 27a to 27h of device 12, two-terminal relays 21a to 21h, B-modular jacks 27Ba to 27Bh, and twisted paired wire cables 34a to 34h. As a result, communications among terminal apparatuses 11a to 11h in the same group, as well as ones outside the group which are performed via main line 15, are conducted via device 12 and second hub unit 13B.

In this state, first hub unit 13A is totally cut off from use, thereby removing any effect which would be caused by breakdown. Therefore, for the maintenance staff to repair the unit, there is no need to shut down the communications function, since it can be repaired when there is time.

Switching from contact point A to contact point B can be done by simply moving switch 24 and can be done by a person other than the maintenance staff. There is no time lost between a breakdown of first hub unit 13A and retrieval of the communications function. Moreover, anyone can handle it easily and swiftly in order to recover the communications function after the breakdown.

Further, if using remote control device 41, when switch 42 therein is positioned at contact point B (closed side), open relay 43 is put into the closed state, resulting in a state in which switch 24 in device 12 is turned. Further, when relay 26 for lighting the lamp in device 12 is turned on, electric current is passed into pilot lamp 25 and, via external connection terminals 45a and 45b, into lamp 44. The state of device 12 can thus be checked by lamp 44 contained in remote control device 41.

FIG. 6 shows, as an example, a system in which the electrical source is derived from device 12. Instead, remote control device 41 itself may contain such an electrical source.

Figure 7:
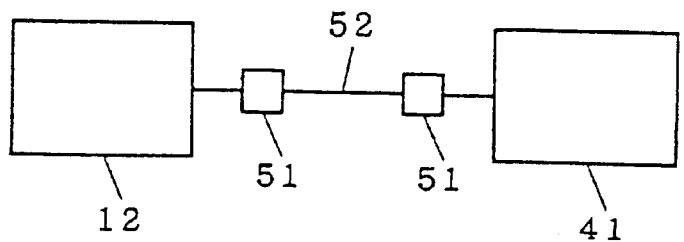
FIG. 7 schematically shows the device for switching over hub units connected to the remote control device via a public line.

Further, to make the best use of the maintenance effect deriving from remote control device 41, the remote control device and device 12 may be connected to public line 52 via modem 51, as shown in FIG. 7. In this way, when engineers or maintenance staff are not present, for example, at branch offices, a specialist in the headquarters can remotely perform the maintenance for those branches. As a result, only a limited number of engineers or maintenance staff need be staffed for many branch offices. Moreover, time loss can be virtually eliminated.

In the above embodiments, device 12 utilizes two-terminal relays 21a to 21h having contact points. However, solid state relays having no contact points may also be used in combination, so as to form two-terminal relays in which terminal A and terminal B can be switched over. If the two-terminal relays are designed so as to secure reliability in high speed use, they can be used in high speed network systems.

Further, hub units 13A and 13B are described as having 8 ports. However, they may contain 4 ports, or any other appropriate number of ports.

According to one aspect of the invention, in a normal state, the first connector contained in each of the device ports is electrically connected to each of the hub ports contained in the first hub unit via a corresponding first cable. Then, the second connector contained in each of the device ports is electrically connected to each of the hub ports contained in the second hub unit via a corresponding second cable.

Further, the third connector contained in each of the device ports can be electrically connected to each of the terminal apparatuses via a corresponding third cable.

Then, each of the third connectors is electrically connected, by virtue of a unit-conversion switch, either to each of the corresponding first connectors or to each of the corresponding second connectors by switching each of the corresponding switching elements, whereby, when a breakdown occurs in the hub unit connected either to the first connectors or to the second connectors, the third connection terminals can be switched over to the other connectors by switching each of the switching elements by virtue of the unit-conversion switch, so that the hub unit in breakdown may be repaired without hurry, and without interrupting communications.

Also, switching can be done very easily, without having recourse to maintenance specialists. There is little handling required or little time lost between the breakdown of first hub unit and recovering the communications function. Moreover, recovering communications can be done swiftly by anyone.

Further, the unit-conversion switch may be provided outside the frame of the device for switching over hub units, so that handling of the unit-conversion switch is rendered even easier.

Furthermore, the first, second, and third connectors in the device ports are differentiated by color, so that wiring error is easily avoided.

In addition, the unit-conversion switch in the device 12 may be connected in parallel with a remote control device and the latter may be equipped with a remote control switch which is similar to the unit-conversion switch. By operating this remote control switch, the third connectors can easily be remotely switched over, from the first connectors to the second connectors, or vice versa.

Although the present invention has been described with reference to particular embodiments, means, and materials, it is to be understood that the invention is not limited to the particulars disclosed and extends to all equivalents within the scope of the claims.

The present disclosure relates to subject-matter contained in Japanese Patent Application No. HEI 9-335765 (filed on Dec. 5, 1997) which is herein incorporated by reference in its entirety.

What is claimed:

1. A device for switching over hub units, said device being connected either to a first hub unit or to a second hub unit in an electrically interchangeable manner, and adapted connectable to a plurality of terminal apparatuses, said device and said first and second hub units respectively comprising an equal number of device ports, first hub ports, and second hub ports for receiving or emitting data signals, said device for switching over hub units further including a unit-conversion switch, said device ports each containing a first, second, and third connector, all of said first connectors being connected to said first hub ports via first cables, all of said second connectors being connected to said second hub ports via second cables, all of said third connectors being connectable to said terminal apparatuses via third cables, said third connectors each including a switching element being switchable over either to said first connectors or to said second connectors, said unit-conversion switch controlling all of said switching elements, such that said terminal apparatuses can be switched over either to said first hub or to said second hub unit.

2. The device according to claim 1, wherein said device for switching over hub units comprises a frame, and said unit-conversion switch is provided outside said frame.

3. The device according to claim 1, wherein said first, second and third connectors contained in said device ports are differentiated by colors.

4. The device according to claim 2, wherein said first, second and third connectors contained in said device ports are differentiated by colors.

5. The device according to claim 1, wherein said unit-conversion switch is connected in parallel with a remote control device, said remote control device including a remote control switch, such that all of said third connectors can be switched over either to said first connectors or to said second connectors.

6. The device according to claim 2, wherein said unit-conversion switch is connected in parallel with a remote control device, said remote control device including a remote control switch, such that all of said third connectors can be switched over either to said first connectors or to said second connectors.

7. The device according to claim 3, wherein said unit-conversion switch is connected in parallel with a remote control device, said remote control device including a remote control switch, such that all of said third connectors can be switched over either to said first connectors or to said second connectors.

8. The device according to claim 4, wherein said unit-conversion switch is connected in parallel with a remote control device, said remote control device including a remote control switch, such that all of said third connectors can be switched over either to said first connectors or to said second connectors.

9. A wiring system comprising:
   a device for switching over hub units, said device being connected either to a first hub unit or to a second hub unit in an electrically interchangeable manner, and connectable to a plurality of terminal apparatuses, said device and said first and second hub units respectively including an equal number of device ports, first hub ports, and second hub ports for receiving or emitting data signals, said device for switching over hub units further including a unit-conversion switch, said device ports each containing a first, second, and third connector, all of said first connectors being connected to said ports via first cables, all of said second connectors being connected to said second hub ports via second cables, all of said third connectors being connectable to said terminal apparatuses via third cables, said third connectors each including a switching element being switchable over either to said first connectors or to said second connectors, said unit-conversion switch controlling all of said switching elements, such that said terminal apparatuses can be switched over either to said first hub or to said second hub unit, and
   at least one of said plurality of terminal apparatuses connected to said device for switching over hub units via said third connectors.

10. The wiring system according to claim 9, wherein said device for switching over hub units comprises a frame, and said unit-conversion switch is provided outside said frame.

11. The wiring system according to claim 9, wherein said first, second and third connectors contained in said device ports are differentiated by colors.

12. The wiring system according to claim 9, wherein said unit-conversion switch is connected in parallel with a remote control device said remote control device including a remote control switch, such that all of said third connectors can be switched over either to said first connectors or to said second connectors.

13. A method of using a device for switching over hub units, said device being connected either to a first hub unit or to a second hub unit in an electrically interchangeable manner, and connectable to a plurality of terminal apparatuses, said device and said first and second hub units respectively including an equal number of device ports, first hub ports, and second hub ports for receiving or emitting data signals, said device for switching over hub units further including a unit-conversion switch, said device ports each containing a first, second, and third connector, all of said first connectors being connected to said first hub ports via first cables, all of said second connectors connected to said second hub ports via second cables, all of said third connectors being connectable to said terminal apparatuses via third cables, said third connectors each including a switching element being switchable over either to said first connectors or to said second connectors, said unit-conversion switch controlling all of said switching elements, such that said terminal apparatuses can be switched over either to said first hub unit or to said second hub unit, said device for switching over hub units being further connected to at least one of said plurality of terminal apparatuses via said third connectors, said method comprising:

electrically connecting said at least one of said plurality ofterminal apparatuses to said third connectors via said third cables;

electrically connecting said third connectors to said first connectors, so that said device for switching over hub units is connected to said first hub ports via said first cables; and switching over said unit-conversion switch, when a breakdown occurs in said first hub unit, so that said switching elements are switched over from said first connectors to said second connectors, whereby said device for switching over hub units is electrically connected to said second hub unit and said first hub unit is made ready for reparation.

14. The method according to claim 13, wherein said unit-conversion switch is electrically connected in parallel with a remote control device, said remote control device including a remote control switch for switching said switching elements, such that said device for switching over hub units is switched over either to said first hub unit or to said second hub unit.

* * * * *

UNITED STATES PATENT AND TRADEMARK OFFICE
CERTIFICATE OF CORRECTION

PATENT NO.    : 6,343,080 B1
DATED         : January 29, 2002
INVENTOR(S)   : N. Kondo Page 1 of 1

It is certified that error appears in the above-identified patent and that said Letters Patent is hereby corrected as shown below:

<u>Column 9,</u>
Line 15, "ofterminal" should be -- of terminal --.

Signed and Sealed this

Twenty-seventh Day of August, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,343,080 B1
DATED         : January 29, 2002
INVENTOR(S)   : N. Kondo It is certified that error appears in the above-identified patent and that said Letters Patent is hereby corrected as shown below:

Column 9,
Line 15, "ofterminal" should be -- of terminal --.

Signed and Sealed this

Fourteenth Day of January, 2003

JAMES E. ROGAN
*Director of the United States Patent and Trademark Office*